June 19, 1951 R. F. GARBARINI 2,557,092
FORCE-RATIO MEASURING AND COMPUTING DEVICE
Filed April 24, 1946
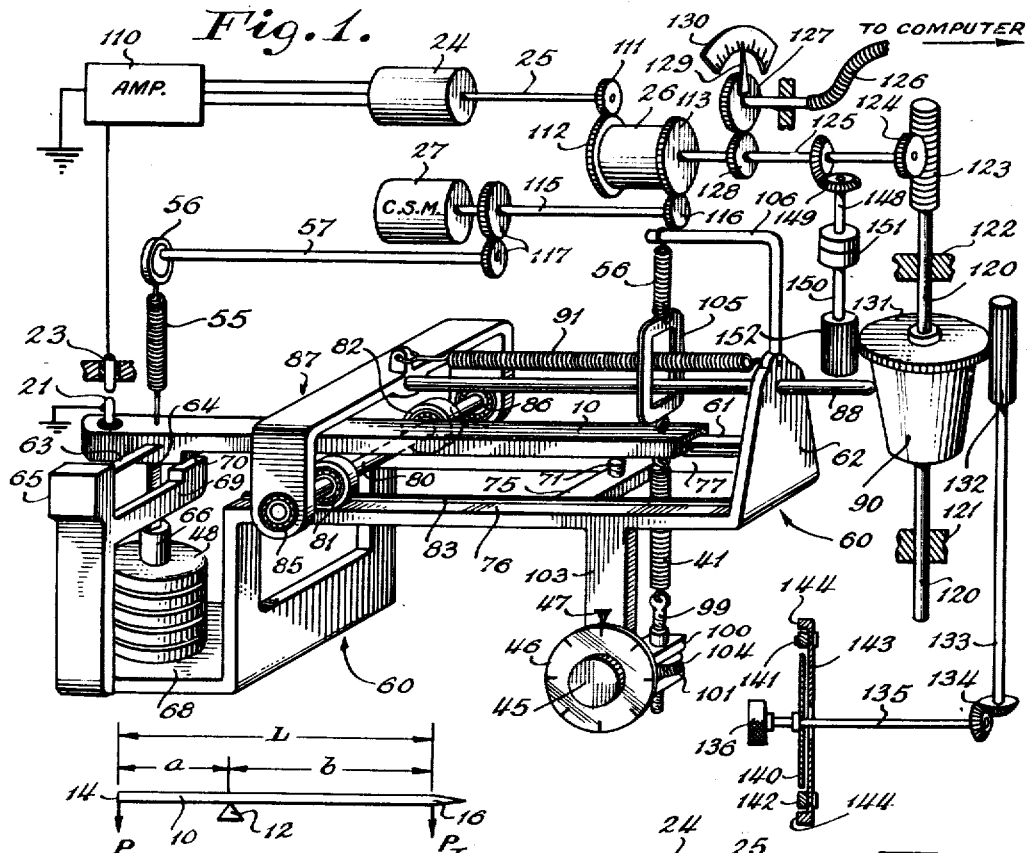
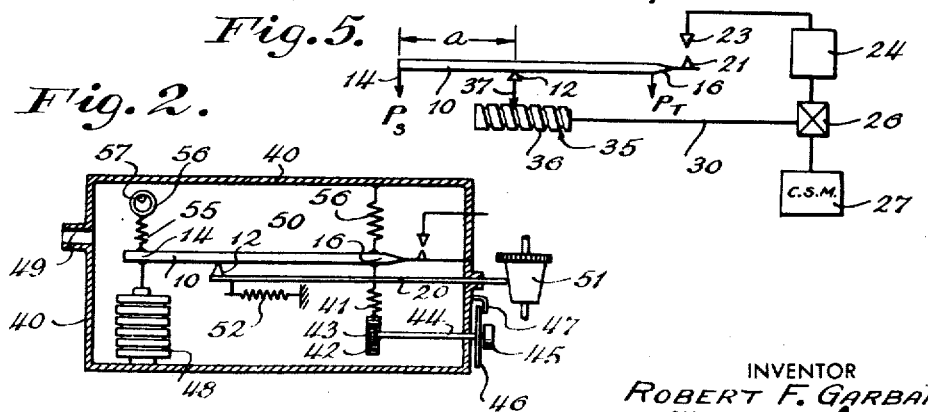
INVENTOR
ROBERT F. GARBARINI
BY
his ATTORNEY Patented June 19, 1951

2,557,092

UNITED STATES PATENT OFFICE 2,557,092

FORCE-RATIO MEASURING AND COMPUTING DEVICE

Robert F. Garbarini, Woodside, N. Y., assignor to The Sperry Corporation, a corporation of Delaware Application April 24, 1946, Serial No. 664,637

22 Claims. (Cl. 73—387)

This invention relates to force-ratio measuring and computing devices. More particularly, the invention comprehends the fabrication and use of novel, self-contained instruments for simultaneously measuring and comparing a plurality of interdependent, variable and varying force-ratios, and delivering torque outputs for operating equipment and mechanical power systems as functions of such force-ratios.

This invention also relates to improvements in special force-ratio measuring instruments, and, more particularly, to computers wherein functions of ratios between forces being measured, any or all of which are continuously variable, are automatically varied or compensated according to variable factors, such as temperature effects, to give true measurements, which can be transmitted to controlled devices or systems with sufficient power to drive same.

The instruments utilized herein are characterized by a number of other features of importance and novelty, including a substantially rigid, yet mobile, shock-proof, low hysteresis, variable fulcrumed lever force-ratio measuring device, which is maintained in balance by special pivot-positioning means, accompanied by appropriate vibration (dithering) of the lever, and force-applying elements, to give a fluid, quick response to any and all control or modifying factors applied thereto.

The invention provides a novel force measuring apparatus in which, during normal operation, under static equilibrium conditions of the system, a fulcrum is mounted for reciprocation along, and in parallel relation to, the longitudinal axis of a lever, and is driven, unilaterally, by a constant speed motor, to a position of unbalance of the lever. A servomotor is effective, upon unbalance of the lever, to restore the fulcrum to the equilibrium position. This gives the fulcrum an inherent, cyclic, oscillating translation about its equilibrium position, the magnitude of which is a function of the inertia, and motor torque characteristics of the balancing system, described herein. When a change occurs in the ratios obtaining between the control forces, the lever is unbalanced and rotates, in the direction of the dominating force-moment, to open or close the circuit of the unidirectional motor to effect translation of the fulcrum to a new, lever-balancing position. The application of a dynamic force to one end of the lever will rock the lever in the direction of the applied force, and thereby increase the time of engagement of contacts controlling the servomotor circuit or vice versa, depending upon the specific instrument which will serve to cause the translation of the fulcrum to the new equilibrium position demanded by the change in the applied force.

The fulcrum will be mounted for reciprocation on a bed or in tracks which are parallel to the normal, horizontal, static-equilibrium position of the lever. The fulcrum may desirably comprise a shaft having a positive bearing against the lever, which is maintained thereagainst by the special mounting features of the assembly. The ends of the fulcrum shaft will be mounted in frictionless roller bearings contained in cages rotating on the fulcrum tracks. These fulcrum tracks may be grooved or channeled to prevent any transverse motion of the fulcrum cage with respect to the longitudinal axis of the lever supported thereon. Such an arrangement will insure the desired static rigidity of the system, while permitting its utmost flexible operation under conditions of use in any position or orientation in space. Even while operating under such flexible conditions, the instrument assembly will maintain its structural rigidity, insuring substantially shock-proof mounting of all the elements in the instrument casing, and preventing damage thereto under conditions of applied shock. Such an instrument mounting or assembly will be especially suited for use in aircraft, and in artillery and other gun installations, which are normally subjected to heavy vibrations and shocks of undeterminable and unpredictable quantity, amount and occurrence.

Further objects and advantages of the present invention include force-ratio measuring instruments generally, of predetermined structure, whose elements can be calibrated for use in a variety of force-responsive systems and which can be incorporated, as functional units or entities, in control systems for automatic operation of same in response to changes in mutually interdependent factors over a wide range of simultaneous variations of said factors.

The factors of novelty herein will be described with particular reference to the drawings in which there is illustrated, by way of example, a novel force-ratio measuring instrument for providing an indication of true altitude.

In the drawings, like numerals refer to similar parts throughout the several views, of which Fig. 1 is an isometric drawing showing the mounting of the movable parts of a force-ratio measuring instrument, and the controls therefor;

Fig. 2 is a schematic diagram of the system of Fig. 1 as mounted in a casing;

Fig. 3 is a schematic diagram of a lever opposed to a shiftable fulcrum for varying the ratios of the applied forces;

Fig. 4 is a schematic diagram of the lever of Fig. 3 with control mechanisms for translating the fulcrum to vary the ratios between applied forces; and Fig. 5 is a view similar to Fig. 4 showing a special fulcrum control.

Altimeters hitherto used indicate pressure altitude only. Pressure altitude values are not usable for computing until they have been converted to true altitude values. In order to arrive at true altitude values, observed pressure altitude values must be corrected for the effects of the mean average air temperature ($T_{ma}$). This factor is derived as the mean of the air temperature at the target or ground, whichever is used, and at the airplane, the temperatures being converted into degrees Kelvin, or absolute temperatures. The desired corrections are usually obtained by means of a C—2 altitude computer, which is a well known special form of circular slide-rule.

Ballistic data for bombsights, as a specific example, is based on true altitude. As a consequence of this determinative condition, no ballistic data can be computed until the following steps are taken: (1) pressure-altitude ($P_s$) is read from dial in pilot's cabin; (2) pressure-altitude reading is corrected by C—2 altitude computer; (3) corrected, true-altitude computation is relayed to bombardier and local turrets. Such a system is cumbersome and time-consuming, and essentially impracticable for use in fighter planes, and other craft which are manned by a single pilot as a one-man crew.

The true-altitude meter described herein, by way of example, incorporates the novel force-ratio measuring instrument so as to give a meter or computer which has small lag during altitude changes, and has sufficient power to drive other mechanisms.

The equation for altitude used herein is as follows:

(1) $$H = KT_{ma} \log\left(\frac{P_T}{P_S}\right)$$

or (2) $$H = KT_{ma} (\log P_T - \log P_S)$$

where $P_T$ = static air pressure at target or ground level,
$P_S$ = static air pressure at the airplane,
$T_{ma}$ = mean absolute temperature between the airplane and the target or ground level,
$K$ = constant,
$H$ = altitude of the airplane above the target or ground level.

Equation (1) shows that the true altitude is a function of the ratio of two pressures $P_T$ and $P_S$, or two forces, if the area over which the pressures act is taken as unity. A measure of this ratio can be obtained as the instant position of the fulcrum of a lever when the two force-moments are balanced. (This is illustrated in Figs. 3, 4, and 5 herein.)

A lever 10 having a fulcrum 12 is shown in the diagram of Fig. 3. Static pressure, $P_S$ as obtaining in an airplane in flight will be assumed to be applied to one arm of the lever at point 14, while the ground, or target pressure, $P_T$, will be assumed to be applied to the lever at point 16. With the moment arm assumed to be massless, and the length between the points 14 and 16 indicated by L, the force arms formed between fulcrum 12 and the ends 14 and 16 will be designated as $a$ and $b$, respectively.

The equation of the moments of force about fulcrum 12 is, therefore, (3) $$aP_S = bP_T$$

From the diagram it will be seen that (4) $$a = L - b$$

where L is a constant. Substituting the value for $a$ from Equation 4 in Equation 3, there is obtained a value for $b$ according to the following equation:

(5) $$b = \frac{L}{1 + \frac{P_T}{P_S}}$$

Equations 3 and 5 hold when the lever is in the balanced positions only, because then the lever is back in the normal set up position and any undesirable torques due to deflection of the suspension means disappear from the moment equation.

Equation 5 shows that the arm $b$ is a measure of the ratio $$\frac{P_T}{P_S}$$

The position of fulcrum 12 can be calibrated, therefore, in this ratio.

Where one of the forces is constant, as, for example, target pressure ($P_T$), the force ratios will be determined by the variation in the complementary force, e. g. static pressure ($P_S$).

The pressure forces can be balanced automatically by translating fulcrum 12 by means of a servo unit, as shown in Fig. 4. In this showing, the fulcrum 12 is shown mounted for lateral translation on one end of an arm 20 having rack 22 at its other end. Contact 21, mounted at one end of the lever arm, engages with a cooperating stationary contact 23 when the lever unbalances in a counter-clockwise direction closing the operating circuit of an intermittently operable unidirectional servomotor 24 having a shaft 25 which drives one input of a subtracting differential mechanism 26. A second input of the differential is operated by a constant speed motor 27. A pinion 29 in mesh with rack 22 is mounted on output shaft 30 of differential 26 and is effective to displace fulcrum 12 in accordance with the difference between the displacements of the inputs of the differential. Motor 27 constantly tends to translate fulcrum 12 in such direction as to close contacts 21 and 23. In Fig. 4 motor 27 constantly translates the fulcrum unidirectionally to balance the lever in a counter-clockwise direction. Since motor 27 is operated continuously it will cause the lever to be displaced from unbalance in one direction, through equilibrium, to an unbalanced condition in the opposite direction. In the latter condition, contacts 21 and 23 will engage and close the operating circuit for motor 24. Motor 24 actuates the differential at twice the speed of motor 27, and thereby reverses the direction of the displacement of the output shaft 30 of the differential and fulcrum 12 to restore the lever to a position of equilibrium whereupon contacts 21 and 23 open causing motor 24 to stop. As motor 27 is constantly operating, the cycle just described is constantly repeated, and the lever is maintained in a state of dynamic equilibrium about its fulcrum. The displacement of fulcrum 12 in the arrangements shown in Figs. 3 and 4 is according to a non-linear function of $$\frac{P_T}{P_S}$$

(Equation 5).

In Fig. 5, fulcrum 12 of lever 10 is actuated by a barrel cam 35, which is displaced by the output shaft 30 of differential 26. The differential is actuated by motors 24 and 27 in the same manner as the corresponding differential 26 of Fig. 4. The cam is formed with a spiral cam groove 36 in which rides a cam follower 37 attached to fulcrum 12, the fulcrum being displaced in one direction or the other in accordance with the direction of rotation of the cam. Cam 35 can be laid out as desired to displace the fulcrums in accordane with either a linear or non-linear function of the ratio $$\frac{P_T}{P_S}$$

In the diagrams considered immediately above, the forces Ps and Pr have been shown as parallel arrows applied at the points 14 and 16 of lever 10. Actually, the forces could be applied by stretching a spring attached to the lever, or by a bellows arrangement fastened to the lever, or by any other suitable force applying device. An arrangement of the kind just referred to is shown in Fig. 2 where a lever 10 enclosed in a casing 40 is provided with a movable fulcrum 12. A spring 41 having one end fastened to the lever at point 16 thereon and the opposite end attached to a rack 42 is used to apply a force to the lever. A pinion 43 on shaft 44 in mesh with rack 42 is turned by knob 45 for the purpose of adjusting the tension of the spring. A dial 46 secured to shaft 44 and cooperating with a stationary index 47 may be laid out to permit the tensioning of spring 41 in accordance with the static pressure Pr at the target.

An evacuated bellows 48 is attached at point 14 on the opposite side of the lever. Preferably, the casing is provided with an opening 49 into the atmosphere. This opening places the inner, plenum chamber of the casing at the ambient altitude pressure of the installation, which pressure is designated as Ps. The bellows will apply a force to the lever in accordance with variations in altitude pressure Ps.

Fulcrum 12 is shown in Fig. 2 as mounted on a sliding support 20 which projects outward through an opening in casing 40, the sliding support engaging the surface of a cam 51 which is used to displace the fulcrum. The cam 51 and the actuating means therefor may be similar to the corresponding cam of Fig. 1, to be described. Spring 52, attached to the sliding member 20 is used to hold the same against the surface of the cam. A static balance and dither spring 55 is secured at point 14 on the lever arm to counterbalance the set up static pull of bellows 48, and this spring may be actuated by any suitable oscillating device such as the eccentric member 56 to which the spring is attached, which eccentric member is mounted on a shaft 57 driven by a constant speed motor such as is shown in any of the Figs. 1, 4 or 5.

A second counter-balance spring 58 is attached to lever 10 preferably to oppose the static pull of spring 41, and serves, with spring 55 as a functional member of the load-supporting, suspensory mounting of lever 10. The counter-balance springs are used during assembly to counter-balance the opposite springs and bellows when the forces Ps and Pr are set at zero. The bellows force Ps may be conveniently made zero by opening bellows 48 to the atmosphere.

In the device as shown in Fig. 2, true altitude will be indicated as a resultant of the forces applied. On turning the Pr knob 45, the tension of calibrated spring 41 is adjusted. As the characteristics of the spring are linear, the change of force will be directly proportional to the rotation of the knob. This is a distinct advantage, in that it makes for simplification of construction and of manipulation. Static air pressure in the casing, acting on the evacuated bellows 48, will give a force, Ps (altitude pressure), applied at the point 14 of the lever. If the area of the bellows is unitary, the force acting thereon will be equal to the static air pressure Ps. The compensating spring 55, as noted, balances the bellows, which is initially set up in tension, so that, as already indicated, the net force at point 14 of the lever is due only to the static pressure when in the balanced position. Usually and desirably, the instrument is so mounted that the fulcrum, or axis of rotation, of the lever is normally parallel to the direction of greatest accelerations, with the result that the effects of accelerations on the unbalance of the lever, when the fulcrum is not at the exect center, are effectively minimized.

Lever 10 should have but one degree of freedom, and this should be in rotation about its fulcrum 12. This condition is obtained by a novel mounting for the lever shown in Fig. 1. In this figure various parts are shown supported by a bracket 60.

In Fig. 1 lever 10 is shown as being supported by a flat spring 61 attached to one end of the lever and disposed in alignment therewith, one end of the spring being secured to an upright 62 of bracket 60. The opposite end of the lever is supported by flat spring 63. Spring 63 is fastened at one end to the side of the lever at right angles thereto in co-planar relation with spring 61. The opposite end of spring 63 is attached to upright 65 of bracket 60. A spring 64 is attached at one end to lever 10 and depends therefrom in right angle relationship to the plane of springs 61 and 63. The lower end of spring 64 is attached to a stud 66 on a bellows 48 fixed to the base 68 of bracket 60. Upright 65 is formed with a horizontal arm 69 having a stop portion 70 thereon disposed immediately underneath lever 10 but normally spaced therefrom which limits the rotation of the lever in one direction about its fulcrum. A similar stop 71 is provided for the opposite end portion of the lever. The latter stop is disposed on a cross member 75 disposed between horizontal rails 76 and 77 formed in bracket 60 which supports a movable fulcrum for lever 10.

The movable fulcrum for lever 10 as shown in Fig. 1 comprises a shaft 80 supported by ball bearing rollers 81 and 82 disposed on the shaft on opposite sides of lever 10. Rollers 81 and 82 ride respectively on rails 76 and 77, the rails being channeled to provide suitable flanges 83 on opposite sides thereof for guiding the rollers thereon.

Ball bearing members 85 and 86 disposed on the fulcrum shaft near opposite ends thereof support respectively a pair of members depending from a yoke or carriage 87 having a horizontal rod 88 fixed thereto which is guided by an opening in upright 62. Rod 88 engages the surface of a three-dimension cam 90 and serves as a cam follower therefor, the cam being used to adjust the position of the carriage and thereby the fulcrum shaft 89 underneath lever 10. Spring 91 attached to carriage 87 and to upright 62 serves to hold cam follower 89 against the cam.

An adjustable spring 41 similar to that shown in Fig. 2 is attached to the lever 10. The upper end of the spring is fastened to the lever and the lower end to a screw 99 which extends through openings in spaced horizontal members 100 and 101 formed on a member 102 depending from rail 76. A nut 104 having a worm gear formed thereon is threaded onto screw 99 and is disposed between members 100 and 101. The nut 104 is turned for the purpose of adjusting spring 41 by a knob 45. The knob turns a worm, not shown, in mesh with the worm gear on nut 104.

As in Fig. 2 a dial 46 is fixed with respect to knob 45 and cooperates with a stationary index 47. A spring 56, corresponding to that of Fig. 2 is attached to the lever 10 by a link 105. The upper end of the spring is supported by an arm 106 attached to upright member 62.

An amplifier 110 has its input circuit controlled by cooperating contacts 21 and 23, the former being mounted on lever 10 and the other disposed in a stationary support.

The amplifier is controlled by the contacts, and controls intermittently, according to the operation of the contacts, a servomotor 24 having a shaft 25 provided with a gear 111 which drives an input gear 112 of a differential 26. A second input gear 113 of the differential is driven by constant speed motor 27 which has a shaft 115 on which is a gear 116 in mesh with gear 113. Preferably, the effective rate of intermittently operable motor 24 is double that of constant speed motor 27. The mechanism actuated by the output of the differential will be described further on.

The shaft 115 of the constant speed motor drives a shaft 57 through gears 117 which actuates an eccentric mechanism 56 for vibrating a dither spring 55 attached to the eccentric mechanism and lever 10.

Cam 90 is supported by a shaft 120 which is free to translate and rotate in bearings 121 and 122.

A circular rack 123 disposed on the upper end of cam shaft 120 is in mesh with a pinion 124 fixed to the output shaft 125 of the differential 26 which serves to displace cam 90 in translation. In the present embodiment of the invention, as will be described, the output displacement of shaft 125 is a measure of true altitude, and the shaft is shown as driving a flexible shaft 126 for a computer by means of gears 127 and 128. The differential output shaft 125 may be also used to control a local indicating device to show true altitude. For this purpose a pointer 129 attached to gear 127 is shown as cooperating with a scale 130 to indicate a measure of true altitude thereon.

Cam 90 has a gear 131 secured thereto in mesh with a long pinion 132 fixed on a shaft 133 coupled by gears 134 to a shaft 135 on which is fixed a knob 136. A scale 140, shown in section, fixed to shaft 135 cooperates with a lubber line 141 on a movable coaxially disposed ring 142 frictionally coupled to, and supported by a fixed plate 143 which carries an outer scale 144 to which lubber line 141 may be positioned. Knob 136 is used for positioning the cam in rotation. The cam may be also positioned in rotation from the output shaft 125 of the differential. For this purpose, shaft 125 drives shaft 148 through gears 149. Shaft 148 is coupled to shaft 150 by a friction clutch 151. A gear 152 on shaft 150 is in mesh with gear 131 on cam 90. Shaft 125 can displace the cam 90 in rotation by the mechanism just described to correct the position of the cam and also the position of scale 140 for the data represented by the displacement of the differential output shaft 125. When the cam is turned by knob 136, however, clutch 151 slips, so that beyond displacing the cam in rotation, adjustment of knob 136 has no effect on the apparatus.

In a true altitude computing device cam 90 is preferably laid out for translation in altitude, H, and rotation in mean absolute temperature, $T_{ma}$. This temperature may be set into the device manually, and varied automatically, by the drive including clutch 151, at about 1° Kelvin for each thousand feet change in altitude. The mean absolute temperature is taken as the arithmetical average of the static air temperature at the ground level, $T_t$, and the static air temperature at the airplane, $T_p$. This relation is shown in the following equation (6) $$T_{ma} = \frac{T_t + T_p}{2}$$

where $T_t$ = absolute air temperature at the target or ground level, and $T_p$ = absolute air temperature at the airplane.

The air temperature at the airplane increases approximately 1.98° Kelvin per thousand feet, with decreases in altitude where temperature inversion does not exist. Consequently, the mean absolute temperature, $T_{ma}$, will decrease at the approximate rate of .99° Kelvin per thousand feet of change.

In the present embodiment of the invention, the mean absolute temperature, $T_{ma}$, is introduced into the system by knob 136 which positions cam 90 in rotation. The stationary outer scale 144 associated with knob 136 is calibrated according to $T_t$. Ring 142 which is frictionally supported by plate 143, is adjusted to position the lubber line 141 thereon opposite correct $T_t$ value on stationary scale 144. Dial 140 which is fixed with respect to knob 136 is calibrated for $T_p$, and knob 136 is moved to position dial 140 with reference to lubber line 141 thereby displacing shaft 135 in the sum of $T_t + T_p$. By introducing a suitable ratio (1:2) in the gear train by which cam 90 is rotated, the average of $T_t$ and $T_p$ is obtained.

As stated above, Equation 5 shows that the arm $b$ of lever 10 is a measure of the ratio $$\frac{P_T}{P_S}$$

and cam 90 may be laid out as to position fulcrum shaft 89 accordingly.

From Equations 1 and 5

(7) $$H = KT_{ma} \log\left(\frac{L-b}{b}\right)$$

(8) $$\frac{H}{KT_{ma}} = \log\left(\frac{L-b}{b}\right)$$

(9) $$\frac{L-b}{b} = \log^{-1}\left(\frac{H}{KT_{ma}}\right)$$

Solving for b, $$(10) \quad L-b = b \log^{-1}\left(\frac{H}{KT_{ma}}\right)$$

$$(11) \quad L = b\left(1+\log^{-1}\left(\frac{H}{KT_{ma}}\right)\right)$$

$$(12) \quad b = \frac{L}{1+\log^{-1}\left(\frac{H}{KT_{ma}}\right)}$$

Equation 12 shows that the lift or travel $b$ of the cam follower rod 88 and fulcrum shaft 80 is a function of H and $T_{ma}$. L is a constant, and the distance between the points of application of $P_s$ and $P_T$. The surface of cam 90 is laid out preferably according to Equation 12.

The flat springs 61 and 62 supporting lever 10 have sufficient flexibility to permit limited rotation of the lever about fulcrum shaft 80, which movement is restricted by stops 70 and 71 to a small angle and therefore the angular displacement of the lever about its fulcrum is always small. The fulcrum shaft 80 is free to turn within the ball bearing rollers 81 and 82 when the fulcrum is displaced, and therefore, the shaft may freely roll on the under surface of lever 10 while the rollers 81 and 82 roll in the opposite direction on tracks 76 and 77, which provides a substantially frictionless arrangement for displacing the fulcrum. Because of the mounting of the lever with flat springs and the elimination of sliding friction by the use of rolling action to translate the fulcrum, static friction energy losses are kept at a minimum. Also, since the lever is operated as a "null" device and is never allowed to get far out of balance, the movement of the springs attached thereto is kept small and hence energy loss due to hysteresis of the spring support is minimized. The dithering arrangement is provided to eliminate further effects of any static friction that may be present, and when the frequency of the dither mechanism is set at approximately twice the natural oscillatory frequency of the unit, the amplitude of oscillation of the servo response can be reduced to a negligible value.

In Fig. 1 constant speed motor 27 constantly drives into differential 26 in such direction that cam 90 is moved to displace carriage 87 and fulcrum shaft 80 toward the left of the drawing to displace lever 10 in a clockwise direction from a condition of unbalance, through a balanced condition and then into an unbalanced condition in the opposite direction. In the latter unbalanced condition contacts 21 and 23 engage thus operating amplifier 110 which causes the unidirectional intermittently operable motor 24 to drive into differential 26. Motor 24 drives the differential at double the rate of motor 27 thereby reversing the direction of output shaft 125 of the differential which causes cam 90 to move in translation in the opposite direction thereby displacing the fulcrum shaft 80 towards the right of the drawing returning the lever to equilibrium and separating contacts 21 and 23 thereby stopping motor 24. As motor 27 is constantly operating, the cycle is repeated and the lever is maintained in a state of dynamic equilibrium about its fulcrum. With the lever in balanced position, which is the case when the servo unit is functioning properly, the translational force for the fulcrum shaft 80 would be theoretically zero. This is assumed by neglecting second order frictional forces and the force of spring 91 which holds cam follower 88 against the surface of cam 90.

When the instrument has been once adjusted, the position of fulcrum shaft 80 required to balance lever 10 will vary in accordance with the output displacement of bellows 46 and since this position depends on the displacement of output shaft 125 of the differential, this shaft, in the case of a true altitude meter, will provide a measure of true altitude.

In a true altimeter where the cam 90 is positioned in rotation according to mean absolute temperature, $T_{ma}$, which as explained above varies with altitude, the cam 90 is constantly displaced in rotation to correct $T_{ma}$ for changing altitude by gear 152 which is driven through friction clutch 151 by the differential output shaft 125. Since knob 136 is connected by a gear and shaft arrangement with the gear 131 on cam 90, the position of knob 136 is also corrected as true altitude changes.

The novel force-ratio measuring instrument herein described will be seen to comprise a substantially fixed lever having one degree of freedom, namely rotation about its fulcrum. The amount of this rotation is variable according to a condition which determines the characteristics of the forces to be measured, which forces are applied at the ends of the lever. These forces may be applied at the ends of the lever by means of calibrated springs, either manually or automatically, and one or both may be substituted by mechanisms responsive to an ambient condition being measured. Thus, in the case of an altimeter, one end of the lever arm may be made responsive to static pressure at the airplane ($P_S$), while the other end is made responsive to target pressure ($P_T$), applied manually through a calibrated spring. The variable fulcrum is responsive to unbalance of force-moments of the system. The relatively fixed lever is supported at the fulcrum of pivot, by its special mounting, in such a manner that it rotates vertically thereon, without sliding frictional engagement therewith. The lever is further freed from any residual static (or Coulomb) friction, resulting from its special mounting, by dithering at a frequency approximately twice that of the natural frequency of the system. This dithering, coupled with the making and breaking of contacts, controls and intermittently operated unidirectional servomotor, through an amplifier, to permit the maintenance of the otherwise fixedly secured lever system in a state of dynamic balance about its pivot. The differential output is utilized to deliver an output corresponding to a function of the force-ratio measurements in the system, and with torque, as well as without introducing extraneous or bulky equipment into the device. The instant device may be mounted permanently in a sealed casing, and the functional elements therein so constituted and arranged as to be susceptible of calibration and to permit the assembly to be utilized in a variety of systems.

The simplicity of the construction, and the normal regidity and fixity of the elements, which are coordinated and consolidated into an extraordinary, shock-proof, yet flexible unit, instantaneously responsive to variable control conditions, is made possible by the special uniplanar suspensory mounting of the control lever or balance arm of the system with a dynamic pivot or fulcrum, variable according to a predominating force, all coupled with the dithering at a suitable frequency.

The unitary mounting of such lever controlled, force-ratio measuring devices, in a single instrument, in substantially shock-proof assemblies, makes the devices especially suited for use in aircraft, and for Marine and Naval uses generally, and also for all uses, such as in various forms of artillery, gunnery, and other like installations, where extraordinary sturdiness and ability to function both positively and accurately, under the most adverse conditions, is an absolute prerequisite.

While the novel instrument herein has been described as comprising, in part, a casing having one inlet for the admission of an ambient control factor, namely static air pressure, it will be understood that any number of variable conditions may be introduced into the casing, and means provided in the casing for applying forces corresponding to the several conditions, or their resultants, in any combination, to the control lever in the manner and form specified hereinabove.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a force-ratio measuring instrument, a lever, a floating mounting arrangement therefor comprising a pair of flat springs secured respectively to opposite ends of the lever, the springs being disposed substantially in the plane of the lever at right angles to each other, a movable fulcrum for the lever, a pair of force applying means including a bellows, the force ratio of which is to be measured attached to the lever in opposition, spring means having a predetermined tension attached to the lever for counterbalancing the force applying means, means constantly tending to displace the fulcrum in one direction to unbalance the lever, an amplifier controlled by the lever when thus unbalanced, a servomotor operated by the amplifier when thus controlled, a mechanism driven by the servomotor for displacing the fulcrum in the opposite direction whereby the fulcrum is caused to oscillate about a position wherein the lever is balanced, and an indicating device jointly controlled by both fulcrum displacing means in accordance with the position of the fulcrum.

2. In a force-ratio measuring instrument, a lever, a floating mounting arrangement therefor comprising a pair of flat springs secured respectively to opposite ends of the lever, the springs being disposed substantially in the plane of the lever and at right angles to each other, a movable fulcrum for the lever, a pair of force applying means for the lever comprising an evacuated bellows and a spring attached to the lever in opposition on opposite sides of the fulcrum, a pair of springs having a predetermined fixed tension attached to the lever so as to counter balance the respective force applying means, means for dithering the lever coupled with one of said springs, means responsive to an unbalanced condition of the lever for displacing the fulcrum to balance the lever, and an indicating device controlled by the last mentioned means in accordance with the position of the fulcrum.

3. In a force-ratio measuring instrument, in combination, a casing, a lever in the casing, a bracket, a movable fulcrum for the lever supported by the bracket, a plurality of force applying means for the lever tending to bias the same in the direction of the predominating force, laterally-rigid, vertically-flexible, coplanar suspension members at the ends of the lever and respectively fixed to the bracket, said suspension members being respectively mounted in and at right angles to the longitudinal axis of the lever, means for reciprocating the fulcrum on the bracket along the longitudinal axis of the lever to vary the force-moments of the lever, and dither means coupled with one of the force applying means for vibrating said lever.

4. In a force-ratio measuring instrument, in combination, a casing, a lever in the casing, a fulcrum for the lever, a bracket supporting the fulcrum, a plurality of force applying means for the lever tending to bias the same in the direction of the predominating force, laterally-rigid, vertically-flexible, coplanar suspension springs at the ends of the lever and respectively fixed to the bracket, said suspension springs being respectively mounted in and at right angles to the longitudinal axis of the lever, means for reciprocating the fulcrum along the longitudinal axis of the lever to balance the force-moments thereof, and dither means coupled with one of the force applying means for vibrating said lever arm at at least double its natural frequency of vibration.

5. In a force-ratio measuring instrument, in combination, a casing forming a plenum chamber, a lever, a bracket supporting the lever in the casing, laterally-rigid, vertically-flexible, coplanar suspension members at the ends of the lever fixed with respect to the casing, at least one of said suspension members being mounted at right angles to the longitudinal axis of the lever, a fulcrum for the lever supported by the bracket, force-applying means and counter balancing means therefor attached to the lever forming with the suspension members and the casing a normally shock-proof supporting system for the lever when in a state of rest, said force applying means being responsive to control conditions to vary the force-moments of the lever about the fulcrum and cause unbalance of the lever and displacement thereof about the fulcrum in the direction of a predominating force-moment, and dither means coupled with the counter-balancing means operable to vibrate said lever at a frequency at least double its natural frequency, whereby the restraining effect of the supporting system is neutralized within predetermined limits without effecting the shock-proof mounting of the lever.

6. A true altitude meter comprising a lever, a movable fulcrum therefor, force applying means for the lever including a bellows responsive to changing air pressure attached to the lever, a spring connected to the lever for applying a predetermined tension to the bellows, means for oscillating the fulcrum about a position wherein the lever is in balanced condition to obtain a measure of the ratio of the forces applied thereto which comprises a cam laid out in accordance with functions of altitude and temperature for displacing the fulcrum, motor means for actuating the cam, including a constantly operating motor tending to turn the cam in one direction at a predetermined rate and an intermittently operable motor controllable by the lever when displaced in a predetermined direction from a balanced condition effective to turn the cam in the opposite direction at a greater rate, and an altitude indicating device actuated by the motor means in fixed relation with the cam.

7. A true altitude meter comprising a lever, coplanar flat suspension springs for the lever at the ends thereof, a movable fulcrum for the lever, a plurality of force applying means for the lever including a bellows responsive to changing air pressure attached to the lever, a spring effective to apply a predetermined tension to the bellows when the lever is in balanced condition, means for oscillating the fulcrum about a position wherein the lever is in balanced condition to obtain a measure of the ratio of the forces applied to the lever which comprises a cam laid out in accordance with functions of altitude and temperature for displacing the fulcrum, motor means for actuating the cam, including an intermittently operable motor controllable by the lever when displaced in a predetermined direction from a balanced condition, and an altitude indicating device actuated by the motor means in fixed relation with the cam.

8. A true altitude meter comprising a lever, a movable fulcrum therefor, a plurality of force applying means for the lever including a bellows responsive to changing air pressure attached to the lever, a spring connected to the lever for counterbalancing the initial bellows spring force applied thereto by the bellows, means for oscillating the fulcrum about a position wherein the lever is in balanced condition to obtain a measure of the ratio of the forces applied to the lever which comprises a cam laid out in accordance with functions of altitude and temperature for displacing the fulcrum, motor means for actuating the cam, the motor means including an intermittently operable motor, actuated by the lever when displaced in a predetermined direction from a balanced condition, an altitude indicating device actuated by the motor means together with the cam, and dither means connected with said spring for vibrating the lever.

9. A true altitude meter comprising a lever, coplanar, flat suspension members for the lever at the ends thereof, a movable fulcrum for the lever, force applying means for the lever including a bellows responsive to changing air pressure attached to the lever, a spring connected to the lever for counterbalancing the initial bellows spring force applied thereto by the bellows, means for oscillating the fulcrum about a position wherein the lever is in balanced condition to obtain a measure of the ratio of the forces applied to the lever which comprises a cam laid out in accordance with functions of altitude and temperature for displacing the fulcrum, motor means for actuating the cam, the motor means including an intermittently operable motor, means actuated by the lever when displaced in a predetermined direction from a balanced condition for controlling the intermittently operable motor, an altitude indicating device actuated by the motor means together with the cam, and dither means attached to the spring for vibrating the lever.

10. A true altitude meter comprising a lever, a movable fulcrum therefor, a plurality of force applying means for the lever including a bellows responsive to changing air pressure attached thereto, a spring for counterbalancing the initial bellows spring force applied by the bellows to the lever, means for oscillating the fulcrum about a position wherein the lever is in balanced condition to obtain a measure of the ratio of the forces applied to the lever which comprises a three dimension cam laid out in accordance with functions of altitude and temperature, means for displacing the cam in one dimension according to temperature, motor means for oscillating the cam in another dimension including an intermittently operable motor, means responsive to the displacement of the lever in a predetermined direction from a balanced condition for actuating the motor, a follower for the cam operatively connected with the fulcrum and an indicating device actuated in fixed relation with the cam by the motor means.

11. A true altitude meter comprising a lever, coplanar, flat suspension members for the lever at the ends thereof, a movable fulcrum for the lever, a plurality of force applying means for the lever including a bellows responsive to changing air pressure attached thereto, means for counterbalancing the initial bellows spring force applied by the bellows to the lever, means for oscillating the fulcrum about a position wherein the lever is in balanced condition to obtain a measure of the ratio of the force applied to the lever which comprises a three dimension cam laid out in accordance with functions of altitude and temperature, means for displacing the cam in one dimension according to temperature, motor means for oscillating the cam in another dimension including an intermittently operable motor, means responsive to the displacement of the lever in a predetermined direction from a balanced condition for actuating the motor, a follower for the cam operatively connected with the fulcrum and an indicating device actuated in fixed relation with the cam by the motor means.

12. A true altitude meter comprising a lever, a movable fulcrum therefor, a plurality of force applying means for the lever including a bellows responsive to changing air pressure directly connected with the lever, a spring connected to the lever for counterbalancing the initial bellows spring force applied thereto by the bellows, means for oscillating the fulcrum about a position wherein the lever is in balanced condition to obtain a measure of the ratio of the force applied to the lever which comprises a three dimensional cam laid out in accordance with functions of altitude and temperance, means for displacing the cam in one dimension according to temperature, motor means for oscillating the cam in another dimension including an intermittently operable motor, means responsive to the displacement of the lever in a predetermined direction from a balanced condition for actuating the motor, a follower for the cam operatively connected with the fulcrum, an indicating device actuated in fixed relation with the cam by the motor means, and a device for dithering the lever coupled therewith.

13. A true altitude meter comprising a lever, coplanar, flat suspension members for the lever at the ends thereof, a movable fulcrum for the lever, force applying means for the lever including a bellows responsive to changing air pressure directly connected with the lever, a spring connected to the lever for counterbalancing the initial bellows spring force applied thereto by the bellows, means for oscillating the fulcrum about a position wherein the lever is in balanced condition to obtain a measure of the ratio of the forces applied to the lever which comprises a three dimensional cam laid out in accordance with functions of altitude and temperature, means for displacing the cam in one dimension according to temperature, motor means for oscillating the cam in another dimension including an intermittently operable motor, means responsive to the displacement of the lever in a predetermined direction from a balanced condition for actuating the motor, a follower for the cam operatively connected with the fulcrum, an indicating device actuated in fixed relation with the cam by the motor means, and a device for dithering the lever coupled therewith.

14. A force-ratio measuring device comprising a lever, a movable fulcrum therefor, a cam laid out according to functions of the forces being measured, a follower for the cam attached to the fulcrum for positioning the same, constantly operated means for displacing the cam and fulcrum to unbalance the lever about the fulcrum in one direction, intermittently operable servo means operatively coupled with the cam and actuated by the lever when thus unbalanced effective to displace the cam and the fulcrum in such direction as to restore the lever to balance and thereby disable the servo means, and a plurality of force exerting means oppositely effective on the lever, at least one of the last mentioned means being variable in accordance with changes in a force being measured.

15. A force-ratio measuring device comprising a lever, a movable fulcrum therefor, force exerting means at the ends of the lever including an evacuated bellows, coplanar, flat suspension spring members for the lever at the ends thereof, a cam laid out according to functions of the forces being measured, a follower for the cam coupled with the fulcrum for positioning the same, constantly operated means for displacing the cam and fulcrum to unbalance the lever about the fulcrum, and means actuated by the lever when thus unbalanced effective to displace the cam and the fulcrum in such direction as to restore the lever to balanced condition.

16. A force-ratio measuring device comprising a lever, a movable fulcrum therefor, a plurality of means for exerting on the lever the forces whose ratios are to be measured including an evacuated bellows coupled with the lever tending to bias the same, laterally-rigid, vertically-flexible, coplanar, flat spring suspension members for the lever at the ends thereof located in the longitudinal axis thereof and at right angles thereto, a cam laid out according to functions of the forces being measured, a follower for the cam coupled with the fulcrum for positioning the same, constantly operated means for displacing the cam and fulcrum to unbalance the lever about the fulcrum in one direction, means actuated by the lever when thus unbalanced effective to displace the cam and the fulcrum in such direction as to restore the lever to balanced condition, the arrangement being such that the position of the fulcrum required to balance the lever is a measure of the ratio of the forces being measured.

17. A force-ratio measuring device comprising a lever, a movable fulcrum therefor, a plurality of force exerting means oppositely connected to the lever including an evacuated bellows, laterally-rigid, vertically-flexible, coplanar, flat suspension spring members for the lever at the ends thereof disposed in the longitudinal axis of the lever and at right angles thereto, a cam laid out according to functions of the forces being measured, a follower for the cam coupled with the fulcrum for positioning the same, a constant speed motor, a differential mechanism actuated thereby having an output shaft effective to displace the cam and fulcrum, said motor being effective normally to displace the cam and fulcrum to unbalance the lever about the fulcrum in one direction, an intermittently operable motor controlled by the lever when thus unbalanced, the last mentioned motor being coupled with the differential and effective to drive the output shaft in the opposite direction to restore the lever to a balanced condition, and force-ratio indicating means controlled by the output shaft.

18. A true altitude meter comprising a lever, a movable fulcrum therefor, laterally-rigid, vertically-flexible, coplanar suspension members at the ends of the lever in and at right angles to the longitudinal axis thereof, a bellows responsive to changing altitude connected to one end of the lever and a spring tensioned according to ground pressure connected to the lever to counterbalance the moment of the bellows, means for imparting an oscillatory movement to the fulcrum about a position wherein the lever is in a balanced condition thereon comprising a three dimension cam laid out in accordance with functions of altitude and temperature, a follower for the cam operatively connected to the fulcrum, means for displacing the cam in a first dimension according to temperature, a differential mechanism coupled with the cam, means for oscillating the cam in a second dimension through the differential mechanism comprising a pair of motors coupled with the differential mechanism respectively and alternately effective to actuate the cam in opposite directions, means for actuating one of the motors controlled by the lever on displacement thereof from a balanced condition, and an altitude indicating device jointly controlled by the motors.

19. A true altitude meter comprising a lever, a movable fulcrum therefor, laterally-rigid, vertically-flexible coplanar suspension members at the ends of the lever in, and at right angles to the longitudinal axis thereof, force applying means for the lever including a bellows responsive to changing altitude connected to the lever, and a spring connected to the lever tensioned according to ground pressure for counterbalancing the moment of the bellows, means for imparting an oscillatory movement to the fulcrum about a position wherein the lever is in balanced condition thereon comprising a three dimension cam laid out in accordance with functions of altitude and temperature, a follower for the cam operatively connected to the fulcrum, means for displacing the cam in one dimension according to temperature, means for displacing the cam in a second dimension comprising a pair of motors effective alternately to displace the cam in a second dimension in opposite directions, means for actuating one of the motors controlled by the lever on displacement thereof in a predetermined direction from a balanced condition, means coupled with the force applying means for dithering the lever, and an altitude indicating device jointly operated by the motors.

20. A force-ratio measuring device comprising a lever, a movable fulcrum therefor, a three dimension cam laid out according to functions of the forces being measured, a follower for the cam operatively connected with the fulcrum, manually operable means for displacing the cam in one dimension, oscillating means for displacing the cam in another dimension effective first to displace the cam and fulcrum in one direction thereby unbalancing the lever, and intermittently operable servo means controlled by the lever when thus unbalanced for displacing the cam and fulcrum in the opposite direction to restore the lever to balanced condition, means comprising a friction drive coupling the oscillating means with the manually operable means to correct the position of the cam in said one dimension in accordance with the actuation thereof by the oscillating means, and an indicating device actuated by the oscillating means.

21. A true altitude meter comprising a lever, a movable fulcrum therefor, force applying means for the lever including a bellows responsive to changing air pressure, a spring connected to the lever for counterbalancing the moment applied thereto by the bellows, means for oscillating the fulcrum about a position wherein the lever is in balanced condition which comprises a three dimension cam laid out in accordance with functions of altitude and temperature, manually operable means for displacing the cam in one dimension according to temperature, motor means for oscillating the cam in another dimension including an intermittently operable motor, means responsive to the displacement of the lever in a predetermined direction from a balanced condition for actuating the motor, a follower for the cam operatively connected with the fulcrum, means for correcting the position of the manually operable means for changing altitude actuated by the motor means, and an altitude indicating device actuated by the motor means.

22. A true altitude meter comprising a lever, a movable fulcrum therefor, force applying means for the lever including a bellows responsive to changing air pressure, a spring connected to the lever for counterbalancing the moment applied thereto by the bellows, means for oscillating the fulcrum about a position wherein the lever is in balanced condition thereon, which comprises a three dimension cam laid out in accordance with functions of altitude and temperature, a follower for the cam operatively connected with the fulcrum, manually operable means for displacing the cam in one dimension according to temperature, motor means for oscillating the cam in another dimension including an intermittently operable motor for positioning the fulcrum to balance the lever, means controlled by the lever when in unbalanced condition for operating the motor, means for correcting the position of the manually operable means for changing altitude comprising a friction drive actuated by the motor means and an altitude indicating device actuated by the motor means.

ROBERT F. GARBARINI.

REFERENCES CITED

The following references are of record in the file of this patent:

UNITED STATES PATENTS

| Number | Name | Date |
|---|---|---|
| 2,013,252 | Pigott | Sept. 3, 1935 |
| 2,220,164 | List | Nov. 5, 1940 |
| 2,398,470 | Shivers | Apr. 16, 1946 |

FOREIGN PATENTS

| Number | Country | Date |
|---|---|---|
| 248,384 | Great Britain | May 25, 1927 |
| 407,903 | Germany | Jan. 5, 1925 |